US012314094B2

(12) United States Patent
Jenkins et al.

(10) Patent No.: US 12,314,094 B2
(45) Date of Patent: May 27, 2025

(54) ACTIVE POWER DISTRIBUTION UNIT PHASE ROTATION FOR POWER REDUNDANCY

(71) Applicant: International Business Machines Corporation, Armonk, NY (US)

(72) Inventors: Luke L. Jenkins, Poughkeepsie, NY (US); John S. Werner, Fishkill, NY (US); Arkadiy O. Tsfasman, Wappingers Falls, NY (US); John Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 18/477,915

(22) Filed: Sep. 29, 2023

(65) Prior Publication Data
US 2025/0110533 A1   Apr. 3, 2025

(51) Int. Cl.
*G06F 1/18* (2006.01)
*G06F 1/30* (2006.01)
(Continued)

(52) U.S. Cl.
CPC .............. *G06F 1/189* (2013.01); *G06F 1/305* (2013.01); *H02J 9/061* (2013.01); *H02J 13/00002* (2020.01); *G06F 2200/261* (2013.01)

(58) Field of Classification Search
CPC .... G06F 1/189; G06F 1/305; G06F 2200/261; H02J 13/00002; H02J 9/061
(Continued)

(56) References Cited

U.S. PATENT DOCUMENTS 6,667,610 B2   12/2003   Piesinger
8,260,579 B2 *  9/2012   Bickel ............... H02J 13/00002
                                                      702/188
(Continued)

FOREIGN PATENT DOCUMENTS

GB         2570357 A        7/2019

OTHER PUBLICATIONS

"Choosing a Power Distribution Unit", CyberPower, 2019, 10 pages.
(Continued)

*Primary Examiner* — Hal Kaplan
(74) *Attorney, Agent, or Firm* — Kimberly Zillig

(57) ABSTRACT

A computer-implemented apparatus and related method control a dynamic phase rotation unit of a power distribution unit (PDU). The method comprises using a processor of a system controller for identifying a PDU group of two or more redundant PDUs, receiving input parameters from an input port of each of the PDUs in the PDU group, and comparing the input parameters from of the PDU group. The method further comprises conditioned upon a determination of the following both being true: 1) the input parameters are within a predefined threshold of similarity; and 2) no uninterruptable power supply (UPS) is present, then, responsive to the determination sending, via a network, a phase rotation command to a phase rotation controller to change the phase rotation switches on at least one of the PDUs in the PDU group. Otherwise, responsive to the determination, not sending the phase rotation command.

20 Claims, 13 Drawing Sheets

(51) Int. Cl.
  *H02J 9/06* (2006.01)
  *H02J 13/00* (2006.01)
(58) Field of Classification Search
  USPC .......................................................... 307/43
  See application file for complete search history.

(56) References Cited

U.S. PATENT DOCUMENTS

| | | | |
|---|---|---|---|
| 8,639,459 | B1 | 1/2014 | Morales |
| 10,031,570 | B2 * | 7/2018 | Morales .................. H02J 9/061 |
| 10,218,179 | B2 | 2/2019 | Kocarev |
| 10,277,030 | B2 | 4/2019 | Dozier |
| 10,978,904 | B2 * | 4/2021 | Churnock ............. H02J 3/0073 |
| 2010/0194378 | A1 | 8/2010 | Kim |
| 2010/0262395 | A1 | 10/2010 | Sharma |
| 2011/0004324 | A1 | 1/2011 | Bickel |
| 2013/0325376 | A1 | 12/2013 | Turicchi, Jr. |
| 2014/0208130 | A1 | 7/2014 | Morales |
| 2018/0138740 | A1 | 5/2018 | Churnock |
| 2022/0100250 | A1 | 3/2022 | Shaikh |

OTHER PUBLICATIONS

"Data Center & Rack Specifications", XNet, 2020, 1 page, <www.xnet.com>.
"Eaton Powerpak Power Distribution Unit", Eaton, 2021, 2 pages.
"Watts Bar Nuclear Plant Diesel Generator Completion Time Extension", TVA, Aug. 4, 2016, 23 pages.
Anonymous, "Differential Power Protection Module", An IP.com Prior Art Database Technical Disclosure, IP.com No. IPCOM000249550D, IP.com Electronic Publication Date: Mar. 3, 2017, 6 pages.
Anonymous, "Method and system for using AC frequency to convey PDU information" An IP.com Prior Art Database Technical Disclosure, IP.com No. IPCOM000222809D, IP.com Electronic Publication Date: Oct. 23, 2012, 3 pages.
Anonymous, "Power Cord Visual Redundancy Detection", An IP.com Prior Art Database Technical Disclosure, IP.com No. IPCOM000266178D, IP.com Electronic Publication Date: Jun. 18, 2021, 5 pages.

* cited by examiner

FIG. 1C

ACTIVE POWER DISTRIBUTION UNIT PHASE ROTATION FOR POWER REDUNDANCY

BACKGROUND

A system and method are described below for power distribution, and in particular to an active power distribution unit (PDU) phase rotation for power redundancy for a dynamic PDU with automatic phase rotation.

Power distribution is an important factor in providing computer-based services to clients, particularly to help ensure safety, security, and availability of applications and data. There are many components involved in ensuring such safety, security, and availability. System failures can have a serious and direct impact on an organization's bottom line, business operations, and customer experience, resulting in revenue loss, missed business opportunities, and a tarnished reputation. According to an annual survey conducted by the Information Technology Industry Council (ITIC), 98% of organizations say that a single hour of downtime costs over $100,000. Beyond such actual costs, downtime can severely impact the productivity of the workforce when they are tied up with trying to restore systems and data instead of focusing on other core focus areas for the business.

The maximum tolerable period of disruption (MTPD) continues to decrease for most companies because there is less tolerance for their operations experiencing any sort of downtime. There is growing pressure and necessity for companies to be able to maintain uptime and recover more quickly from a disruption, no matter how it was caused. Many companies do not have separate power feeds delivering power to a product either due to facility limitations or the added cost of upgrading their infrastructure. These companies may face huge consequences in the event of an unexpected phase loss event which would power off one or more subcomponents and create downtime on their systems. Such an event may have huge cost and human resource implications and might tarnish the service provider's reputation with clients that are using the services running on these systems.

It is common to design products, such as mainframes, servers, and server subcomponents, with redundant power (i.e., 2N) in order to minimize downtime in the event of a power disruption. While many products provide the ability to deliver redundant power at a product level, there are still requirements to have independent input power feeds at a data center to take full advantage of the product redundancy in the event of a power outage.

Many companies do not have access to independent input power feeds or an uninterruptable power supply (UPS) for their computer equipment, usually due to cost, location, or infrastructure limitations. These companies may face system downtime risks in the event of an unexpected phase loss, which is a common infrastructure fault due to an upstream circuit breaker trip, feed transformer failure, or severe weather-related outages. These system failures may result in significant costs, may require employees hours to address, and may tarnish the service provider's reputation with clients when system operation is not reliable.

Providing power redundancy is one way to address an unexpected phase loss event. While many products provide the ability to deliver redundant power at a product level, there may still be requirements to have separate power feeds at a data center level for such systems to take advantage of product redundancy in the event of a power outage. Having a well-planned redundancy design implemented into a data center environment is one of those components.

SUMMARY

A computer-implemented method is disclosed for controlling a dynamic phase rotation unit of a power distribution unit (PDU). The method comprises using a processor of a system controller for identifying a PDU group of two or more redundant PDUs, receiving input parameters from an input port of each of the PDUs in the PDU group, and comparing the input parameters from of the PDU group. The method further comprises conditioned upon a determination of the following both being true: 1) the input parameters are within a predefined threshold of similarity; and 2) no uninterruptable power supply (UPS) is present, then, responsive to the determination sending, via a network, a phase rotation command to a phase rotation controller to change the phase rotation switches on at least one of the PDUs in the PDU group. Otherwise, responsive to the determination, not sending the phase rotation command.

A system controller apparatus is disclosed for controlling a dynamic phase rotation unit of a power distribution unit (PDU), the system controller comprising a memory, and a processor that executes instructions stored in the memory. The apparatus is configured to identify a PDU group of two or more redundant PDUs, receive input parameters from an input port of each of the PDUs in the PDU group, and compare the input parameters from of the PDU group.

The apparatus is configured to, conditioned upon a determination of the following both being true: 1) the input parameters are within a predefined threshold of similarity; and 2) no uninterruptable power supply (UPS) is present, then, responsive to the determination send, via a network, a phase rotation command to a phase rotation controller to change the phase rotation switches on at least one of the PDUs in the PDU group. Otherwise, responsive to the determination, not send the phase rotation command.

A power distribution unit (PDU) system is disclosed, comprising a system controller apparatus for controlling a dynamic phase rotation unit of a power distribution unit (PDU). The system controller comprises a memory, and a processor that executes instructions stored in the memory. The system controller is configured to identify a PDU group of two or more redundant PDUs, receive input parameters from an input port of each of the PDUs in the PDU group, and compare the input parameters from of the PDU group.

The system controller is further configured to, conditioned upon a determination of the following both being true: 1) the input parameters are within a predefined threshold of similarity; and 2) no uninterruptable power supply (UPS) is present, then, responsive to the determination send, via a network, a phase rotation command to a phase rotation controller to change the phase rotation switches on at least one of the PDUs in the PDU group. Otherwise, responsive to the determination not send the phase rotation command.

The PDU system also comprises the PDU. The PDU comprises a phase rotation controller located on the PDU, and the phase rotation controller comprises a memory and a processor that executes instructions stored in the memory and is configured to receive the phase rotation command, and responsive to receipt the phase rotation command, rotate the phases of the PDU.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 1C is a block diagram of example equipment racks within the data center, according to some embodiments.

FIG. 2 shows the phase rotation switches in a first position, according to some embodiments.

FIG. 3 shows the phase rotation switches in a second position, according to some embodiments.

DETAILED DESCRIPTION

Figure 1A:
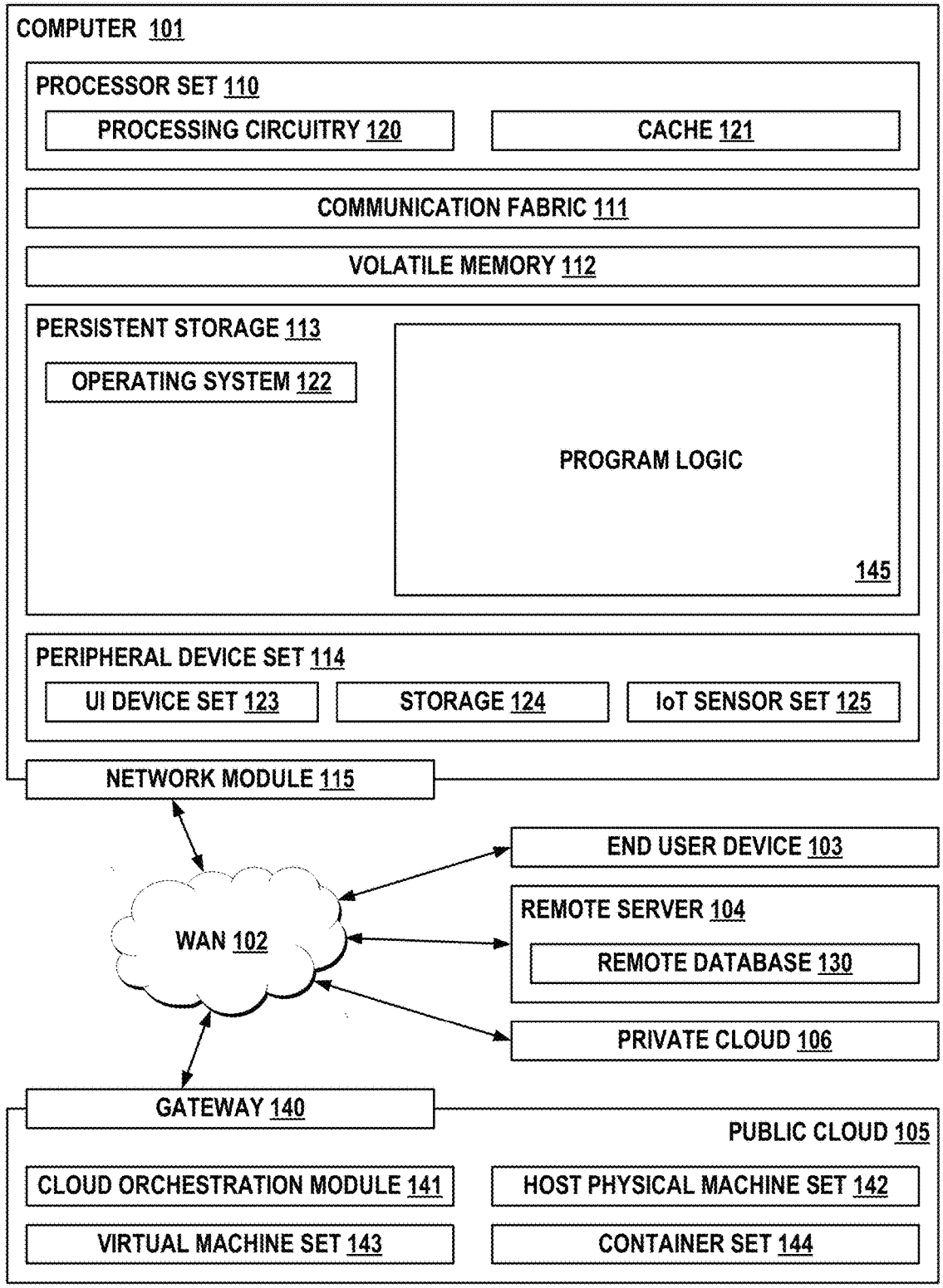
FIG. 1A is a block diagram of a general computing device and environment.

The following general acronyms may be used below:

TABLE 1

| General Acronyms | |
| --- | --- |
| CD-ROM | compact disc ROM |
| CPP | computer program product |
| DVD | digital versatile disk |
| EPROM | erasable programmable read-only memory |
| EUD | end-user device |
| IoT | Internet of Things |
| LAN | local-area network |
| NFC | near field communication |
| RAM | random access memory |
| ROM | read-only memory |
| SAN | storage area network |
| SD | secure digital |
| SDN | software-defined networking |
| SRAM | static random-access memory |
| UI | user interface |
| USB | universal serial bus |
| VCE | virtual computing environment |
| WAN | wide-area network |

Data Processing System in General

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1A is a block diagram of a general computing device and environment. Computing environment 100 contains an example of an environment for the execution of at least some of the computer code involved in performing the inventive methods disclosed herein, including program logic 145 that may be implemented in various combinations of hardware and/or software described below. In addition to the program logic 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program logic 145, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the program logic 145 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the program logic 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Certain reference numbers or characters may be represented as being pluralities (e.g., 100.1, 100.2, etc.). In such instances, reference to a single reference number (e.g., 100) may represent the plurality of entities, or may represent an example of the set, depending on the context. This similarly applies to reference numbers or characters that use subscripts.

Active Power Distribution Unit Phase Rotation for Power Redundancy

The following application-specific acronyms may be used below:

TABLE 2

| Application-Specific Acronym | |
| --- | --- |
| BMC | baseboard management controller |
| DCIM | data center infrastructure management |
| DCS | data center system |
| iPDU | intelligent power distribution unit |
| PDU | power distribution unit |
| PPRS | power distribution unit phase rotation system |
| PSU | power supply unit |
| UPS | uninterruptable power supply |

Redundant power provides many benefits for addressing outages, and it is common to design products such as mainframes, servers, and server subcomponents with redundant power (i.e., 2N). Disclosed herein is a dynamic PDU capable of phase rotation for power redundancy along with a system for controlling it. According to various embodiments disclosed herein, a dynamic PDU is a PDU comprising, among other things, phase rotation switches and a phase rotation controller capable of operating the switches for performing a phase rotation. A method is also disclosed for a system that identifies groups of redundant PDUs, compares input parameters within the PDU group, and changes the phase rotation switches of one of the PDUs in the PDU group if it is detected that the same power feed is supplying all PDUs in a group and a UPS is not being used. Some benefits of various embodiments disclosed herein are an improvement in power redundancy for customers that do not use separate power feeds or a UPS, which may improve customer satisfaction.

Figure 1B:
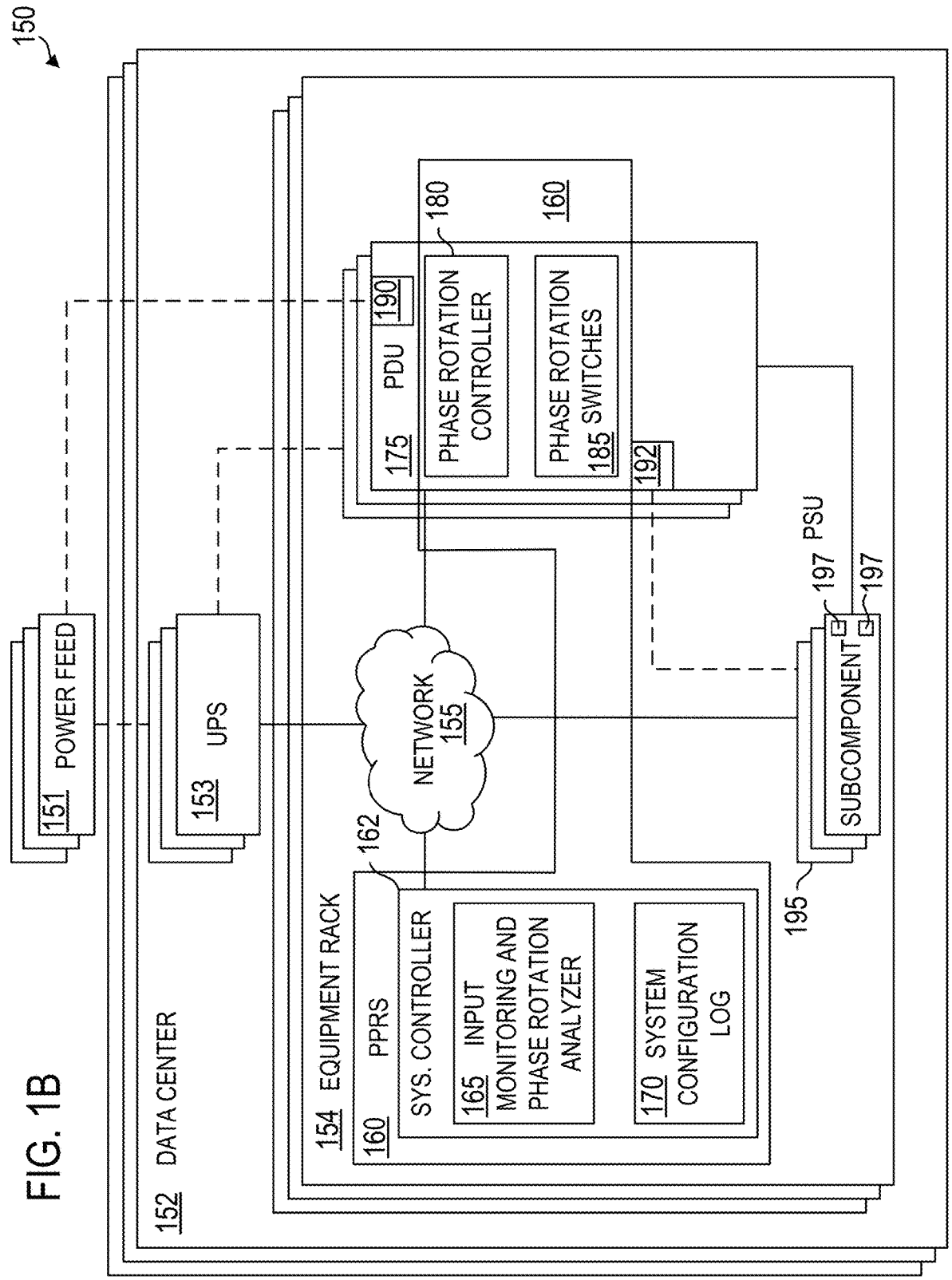
FIG. 1B is a block diagram of an example data center system, according to some embodiments.

FIG. 1B is a block network diagram that illustrates various components for a data center system (DCS) 150 that utilizes an example dynamic PDU phase rotation system (PPRS) 160 for improved power redundancy, according to some embodiments. In FIG. 1B, dashed lines represent power distribution and solid lines represent data communication. The DCS 150 contains one or more power feeds 151 and one or more data centers 152. The power feeds 151 provide power to a plurality of uninterruptible power supplies (UPSs) 153 and/or PDUs 175 within the data center 152.

Various embodiments of the disclosure may be useful when: 1) there is only one power feed 151 supplying power to the data center 152 or if equipment racks 154 are not powered per recommendation; and 2) two or more PDUs 175 supplying power to the same components within equipment rack 154 are receiving input from the same power feed 151.

The data center 152 may contain a plurality of UPSs 153 and/or a plurality of equipment racks 154. One or more UPSs 153 are optional and may provide emergency power to a load (e.g., PDUs 175 of equipment racks 154) when the input power source (e.g., power feed 151) fails. The equipment rack 154 may comprise a system controller 162, two or more power distribution units (PDUs) 175, and one or more subcomponents 195 interconnected via a wired and/or wireless network 155. The subcomponents 195 may be servers, I/O drawers, switches, etc.

The system controller 162 may be implemented as a computer 101, as described above. The program logic 145 may be implemented in any combination of software and hardware that is used to operate the system controller 162. The PPRS 160 may be integrated with the system controller 162 and the PDU 175. In one or more embodiments, the equipment racks 154 represent (contain) a single server or mainframe computer (a system) and its associated subcomponents. In some embodiments, such a system may be spread out over multiple equipment racks 154. In some embodiments, an equipment rack 154 may comprise multiple systems and associated components. These configurations may be mixed (systems and their relationships to equipment racks).

The wired and/or wireless network 155 may utilize any communication protocol that allows data to be transferred between components of the system (e.g., PCIe, I$^2$C, Bluetooth, Wi-Fi, Cellular (e.g., 3G, 4G, 5G), Ethernet, fiber optics, etc.).

The subcomponents 195 may be any type of a server drawer and/or component (e.g., processor drawer, IO drawer, ethernet switch, radiator, etc.) that receives output power from the one or more PDUs 175. In one or more embodiments, the subcomponents 195 have redundant power inputs (e.g., contain two or more PSUs 197). In one or more embodiments, the subcomponents 195 are not part of the equipment rack 154 (e.g., may be located on a shelf, table, etc.). In one or more embodiments, subcomponents 195 may be completely isolated and not connected to network 155, but still receive power from the one or more PDUs 175.

The system controller 162 may contain input monitoring and phase rotation analyzer 165 and system configuration file 170. In one or more embodiments, the system controller 162 may be located on the service element (SE) of an equipment rack 154. In one or more embodiments, the system controller 162 may be located on a baseboard management controller (BMC) of an equipment rack 154. In one or more embodiments, the system controller 162 is part of a data center infrastructure management (DCIM) system (e.g., Cormant-CS®, EkkoSense®, Sunbird®, etc.) and may be located outside of the equipment rack 154. In some embodiments, the DCIM is located within each datacenter 152.

In some embodiments, the system controller 162 may be inside one or more of the data centers 152 and in some embodiments, the system controller 162 may be outside of the data center 152. In some embodiments, the DCIM may be a system that monitors/controls multiple datacenters (i.e., part or all of the DCS 150). In one or more embodiments, the system controller 162 is contained within one or more of PDUs 175.

The input monitoring and phase rotation analyzer 165 may comprise a monitoring device (not shown) to monitor the input signals at the input port 190 of the two or more PDUs 175. These input signals may include, but are not limited to, current, voltage, and power. The input monitoring and phase rotation analyzer 165 may further comprise analysis tools for analyzing these input signals and making a determination as to whether phase rotation is required when it is detected that phases from separate PDUs 175 are coming from the same power feed 151 and supplying power at output ports 192 of the PDUs 175 to the same subcomponents 195. The input signal from the input port 190 is the input signal to the PDU 175 from either the power feed 151 or the UPS 153 that is monitored by input from the input monitoring and phase rotation analyzer 165 of the system controller 162.

The system configuration file 170 may contain the system or the DCS 150 rules. These may include, e.g., plug rules (e.g., corresponding to the layout in FIG. 1C) and power supply redundancy information. By way of a first example, the file 170 may contain a single two-unit (2U) server model that has two PSUs with 2N redundancy. The file may contain data related to PDU output ports 192 that connect to the two server inputs. By way of a second example, the file 170 may contain subcomponent data related to a server that uses four racks, that contains four processor drawers, ten IO drawers, two radiators, four ethernet switches, two service elements, and eight PDUs. The file 170 in these examples would contain information on all the PDU output plug information to all of these subcomponents. In these two examples, the measurements from the input monitoring and phase rotation analyzer 165 may be used to determine if a phase rotation is needed based on the system plug configuration.

In one or more embodiments, the system configuration file 170 is not required and the current/power consumed on each phase of each PDU 175 is used to determine when the same subcomponents 195 are plugged to the same phase from the same feed on different PDUs 175.

Figure 1C:
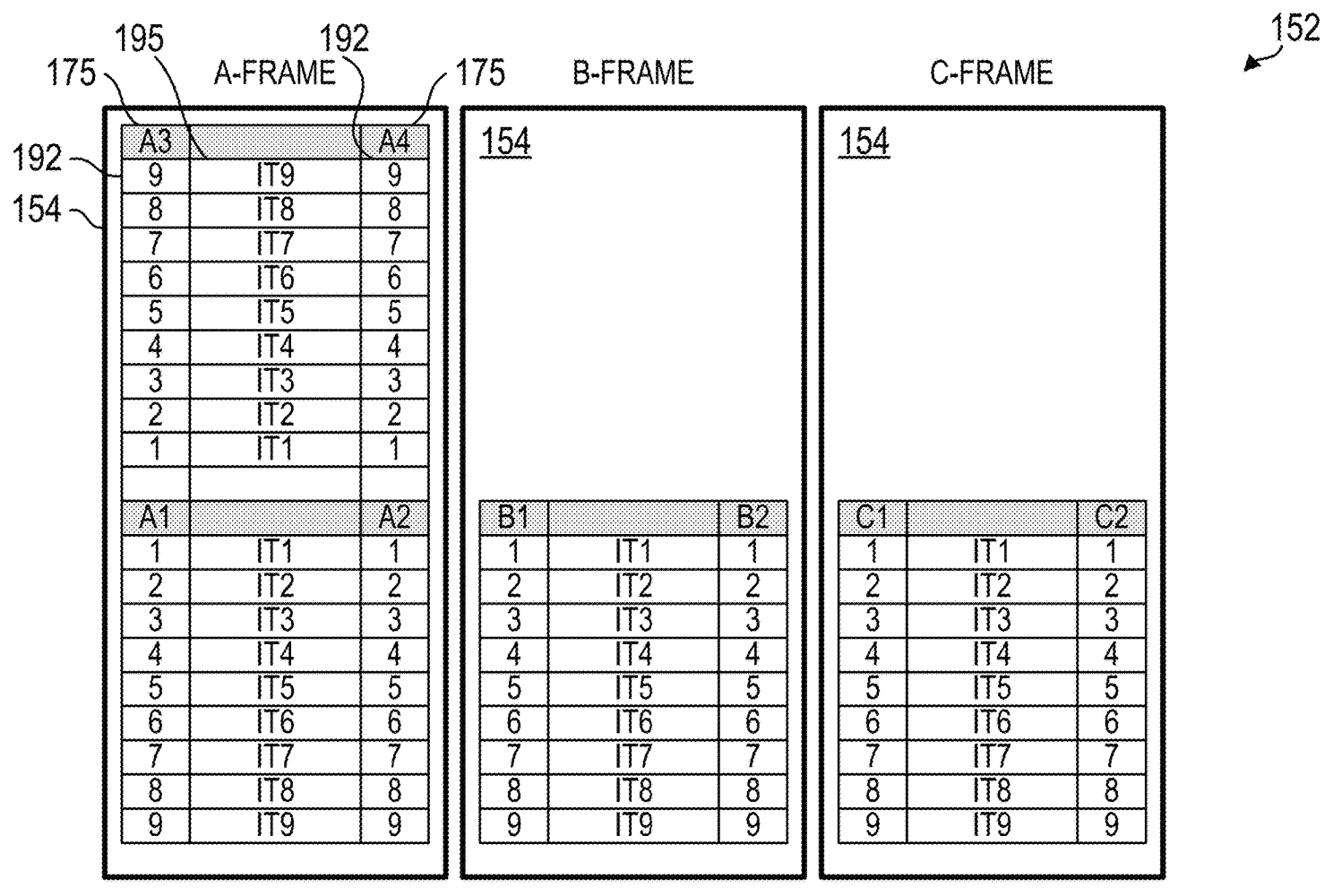

FIG. 1C is a block diagram illustrating example equipment racks 154 (A-Frame, B-Frame, C-Frame) illustrating the PDUs 175 (A1-A4, B1, B2, C1, and C2). The PDUs 175 are organized with 2N redundancy as illustrated. Thus, each of the subcomponents 195 (IT1-IT9) interfaces with PDU output ports 192 from two different PDUs 175 (e.g., A1 and A2). As shown in FIG. 1B, but not FIG. 1C, each of the PDUs 175 comprises two PSUs 197. Plug rules that are stored in the system configuration file 170 may contain a data mapped description of the organization shown in FIG. 1C.

In sum, according to various embodiments, in response to a predicted phase failure in delivering power to a subcomponent 195, if PDU 175 redundancy is established, either by looking at the system configuration file 170 or by making measurements of system input parameters by looking at signals at the input ports 190, then a phase rotation controller on one of the redundant PDUs 175 can be used to switch an available phase to deliver power to the subcomponent 195 in a manner where power will still be delivered in the event of a phase failure (absent a functioning UPS).

Recognizing that redundant PDU phases are feeding the same PSUs/subcomponents within a set of redundant power inputs, the phases are rotated or changed to prepare for a future potential phase failure. The term "rotate", as used herein may serve as a proxy to also mean "change", as the actual switches themselves may not necessarily "rotate". Since the rotation was performed, a phase failure after the rotation has occurred allows the subcomponent/server to remain powered on using the other phase. Had the phases not been rotated, the component would turn off since a single phase (e.g., phase A) was powering the redundant subcomponents server inputs.

It is preferable to rotate phases ahead of a predicted failure time to protect against a potential future phase failure. However, in some embodiments, it may still be possible to wait for the phase failure to happen before performing the switchover, but in this situation, the switchover would need to happen faster than the PSU is designed to stay up to support power dips (i.e., performing the switchover before the subcomponent experiences a power off.

High power transistors can switch on the order of microseconds or even nanoseconds. This could be beneficial in embodiments where the switchover happens only when a failure occurs, as long as the switchover occurs in less than a defined time that the power supply is designed to support for power dips.

Because the subcomponents have redundant inputs, the switching time does not necessarily have to be extremely fast. It would be sufficient even if the switchover is done over the course of a few seconds to ensure that phases are not shorted or to allow for capacitor discharge during the switchover.

Figure 2:
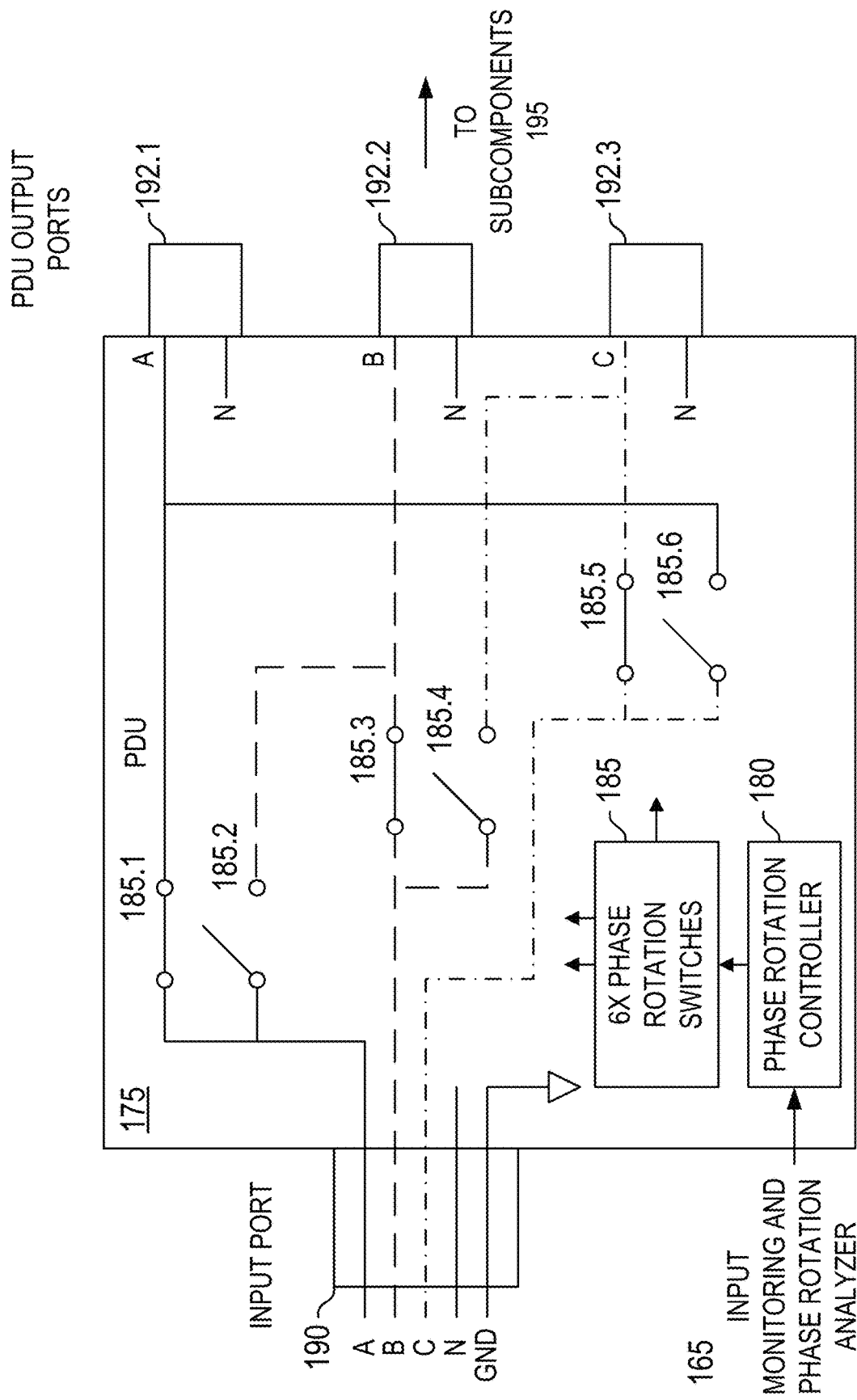
FIGS. 2 and 3 are schematic block diagrams describing some embodiments of an example wye-configured PDU illustrating switch rotation.
Figure 3:
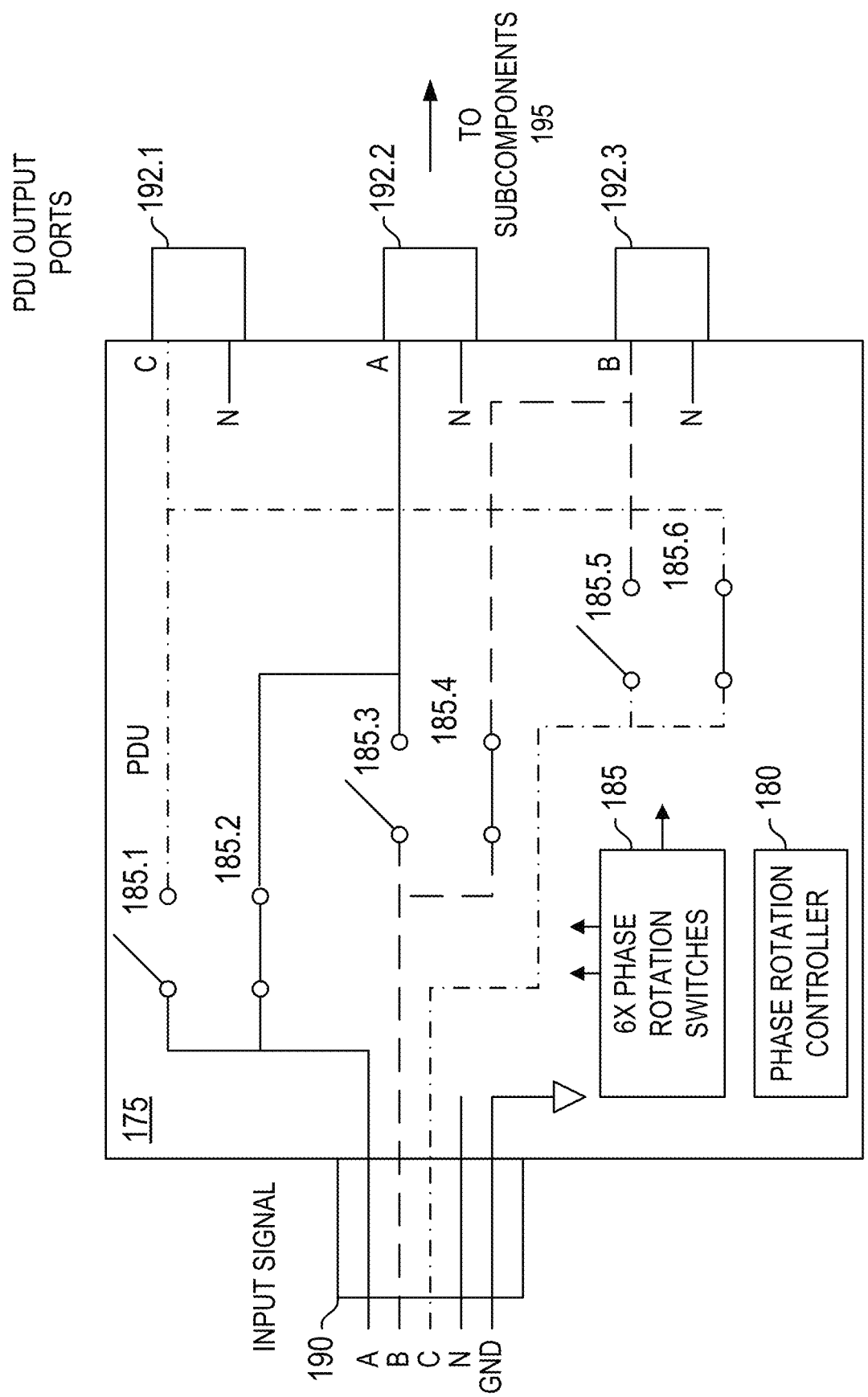

FIGS. 2 and 3 are schematic block diagrams describing some embodiments of an example wye-configured PDU 175 with phase rotation switches 185 and illustrating switch rotation. In FIGS. 2 and 3, different line dash configurations show the different input phases. FIG. 2 shows the phase rotation switches 185 in a first position, and FIG. 3 shows the phase rotation switches 185 in a second position.

The phase rotations switches in FIGS. 2 and 3 are shown with single-pole, single-throw (SPST) switches for the sake of simplicity, however, single-pole, double-throw (SPDT), single-pole, triple-throw (SP3T) switches, or other types of switches could be used as well. The switches may be implemented as circuit breakers, relays, and/or semiconductor switches, such as transistors and the like. Although not illustrated, by way of example, using SP3T switches may permit any input to be mapped to any output phase (e.g., the common pole connects to the input, and the three switchable terminals each connect to an output phase).

Although some embodiments having a simpler switching configuration (for the sake of cost, switching characteristics, etc.) might not allow a swapping of any phase with any other phase, this capability is not essential, since what is important is that the subcomponents are not powered from the same PDU input phase-thus, being able to swap to one other phase is enough. The phase rotation referenced herein rotates the entire phase rather than just switching the phase that a PDU output connects to.

By way of example, a PDU may have a single three-phase input with nine output ports. Ports 1-3 connect to phase A, ports 4-6 connect to phase B, and ports 7-9 connect to phase C. Phase rotation here means that those groups of output ports are rotated to another phase input. Thus, after a phase rotation, ports 1-3 connect to phase B, ports 4-6 connect to phase C, and ports 7-9 connect to phase A. So if powering two redundant PSUs in a subcomponent from port 1 of two separate PDUs, then leaving the first PDU not rotated and the second PDU rotated would ensure that the subcomponent has one PSU powered from phase A and the second PDU powered from phase B. If either phase A or B were to fail, the subcomponent would be powered entirely off one PSU powered from the unfaulted phase. Without the phase rotation on the second PDU, both PSUs would be receiving power from phase A from the power feed-so if phase A failed, the subcomponent would power off.

The input monitoring and phase rotation analyzer 165 is described further with reference to FIG. 2. As shown, the PDUs 175 receive input power from one or more power feeds 151 or UPSs 153 and distribute the power to subcomponents 195 within equipment rack 154 or other equipment within an equipment rack 154 or data center 152. In one or more embodiments, the PDU 175 is an intelligent PDU (iPDU). In one or more embodiments, the PDU 175 is configured to handle two or more phases and these phases may be in various configurations (e.g., three-phase delta, three-phase wye, etc.) The delta-configured PDUs may require up to twice as many phase rotation switches 185. The PDU 175 may contain a phase rotation controller 180, phase rotation switches 185, the input port 190 for receiving input signals, and a plurality of output ports 192.

As shown in FIG. 2, the phase rotation controller 180 may be implemented as a computer 101, as described above. The program logic 145 may be implemented in any combination of software and hardware that is used to operate the phase rotation controller 180. The phase rotation controller 180 receives input from the input monitoring and phase rotation analyzer 165 and determines the correct position of phase rotation switches 185. The phase rotation controller 180 sends a signal to the phase rotation switches 185 when they need to be changed. Upon receipt of this signal, the phase rotation switches 185 flip two phases such that the outputs of the PDU 175 provide power to a different group of zero or more subcomponents 195.

The phase rotation switches 185 may start in a predefined position upon initial power on of PDU 175. The predefined position may be dictated by hardware, software, or combination of hardware and software. The phase rotation switches 185 may be any component capable of switching phases (e.g., relay, electronic switch, transistor, circuit breaker, etc.) In one or more embodiments, phase rotation switches 185 switch within a maximum allowed time (e.g., to support power dips) such that subcomponents 195 do not go down during a phase rotation operation.

In the example illustrated in FIG. 2, a first PDU 175 takes a three-phase wye input at its input port 190. This PDU 175 provides nine outputs arranged in three groups of three 192.1, 192.2, 192.3 (collectively or by way of example, 192): a first group of three outputs 192.1 to a first set of subcomponents 195 that operate on phase A, a second group of three outputs 192.2 to a second set of subcomponents 195 that operate on phase B, and a third group of three outputs 192.3 to a third set of subcomponents operate on phase C.

A second PDU 175 takes a three-phase wye input at its input port 190. This PDU 175 provides nine outputs 192 that provide power to the same subcomponents 195 described in the preceding paragraph and that contain redundant power supply units (PSUs) as the first PDU and the second PDU have the same plug order: a first group of three outputs 192.1 to a first set of subcomponents 195 that operate on phase A, a second group of three outputs 192.2 to a second set of subcomponents 195 that operate on phase B, and a third group of three outputs 192.3 to a third set of subcomponents operate on phase C.

The following provides a clarifying illustrative example. The PSUs may be located within the subcomponents 195. An IO drawer may use two PSUs and be 2N redundant, meaning that it only needs one PSU to operate. A radiator may use two PSUs and be 2N redundant. A service element (SE) may use two PSUs and be 2N redundant. A processor drawer may use four PSUs and be 2N redundant meaning that it only needs two PSUs to operate. These PSUs all use single phase input, which is why the subcomponent 195 goes down in embodiments described above if a single input phase to the PSU (of the subcomponent 195) is lost that powers both PSUs in the IO drawer, radiator, and SE or all four PSUs in the processor drawer. Thus, if both PSUs for the IO drawer operate on phase A and the phase A input to the PDU is lost, neither PSU in the IO drawer will receive any power and the IO drawer subcomponent 195 will go down. By rotating the phases of one of the PDUs, the IO drawer would be powered on phase A to one PSU and phase C on another PSU, so if phase A is lost, the entire IO drawer could run in N mode on the single PSU that still has power because phase C was not lost. As used herein, the term "rotating the phases" and "rotating the switches" may involve physically actually rotating the switch(es), but it may also simply mean changing the phase rotation switches to achieve the providing of a different phase.

If the same power feed 151 is supplying input power to the first and second PDU 175, and no UPSs 153 are used, phase rotation switches 185 of only one of the PDUs 175 will change based on a signal sent by phase rotation controller 180 as illustrated in FIG. 3 (e.g., only phase rotation switches 185 of the second PDU 175 are changed such that the first group of three outputs 192.1 to the first set of subcomponents 195 operate on phase C, the second group of three outputs 192.2 to the second set of subcomponents 195 operate on phase A, and the third group of three outputs 192.3 to the third set of subcomponents operate on phase B).

Because subcomponents 195 with redundant inputs now receive power from different phases of the same power feed 151, no subcomponents 195 will fully power off in the event of an unexpected phase loss event from the power feed 151.

The following Table 3 provides the switch configuration for a non-rotated wye configured system, as shown in FIG. 2.

TABLE 3

Switch Configuration (Non-Rotated) for Wye Configuration

| Switch | Status | Input (L) Φ | Output Port No | Output Port Conn. |
|---|---|---|---|---|
| 1 | closed | A | 1 | sw 1 |
| 2 | open | A | | |
| 3 | closed | B | 2 | sw 3 |
| 4 | open | B | | |
| 5 | closed | C | 3 | sw 5 |
| 6 | open | C | | |

The following Table 4 provides the switch configuration for a non-rotated wye configured system, as shown in FIG. 3.

TABLE 4

Switch Configuration (Rotated) for Wye Configuration

| Switch | Status | Input (L) Φ | Output Port No | Output Port Conn. |
|---|---|---|---|---|
| 1 | open | A | | |
| 2 | closed | A | 2 | sw 2 |
| 3 | open | B | | |
| 4 | closed | B | 3 | sw 4 |
| 5 | open | C | | |
| 6 | closed | C | 1 | sw 6 |

Figure 4:
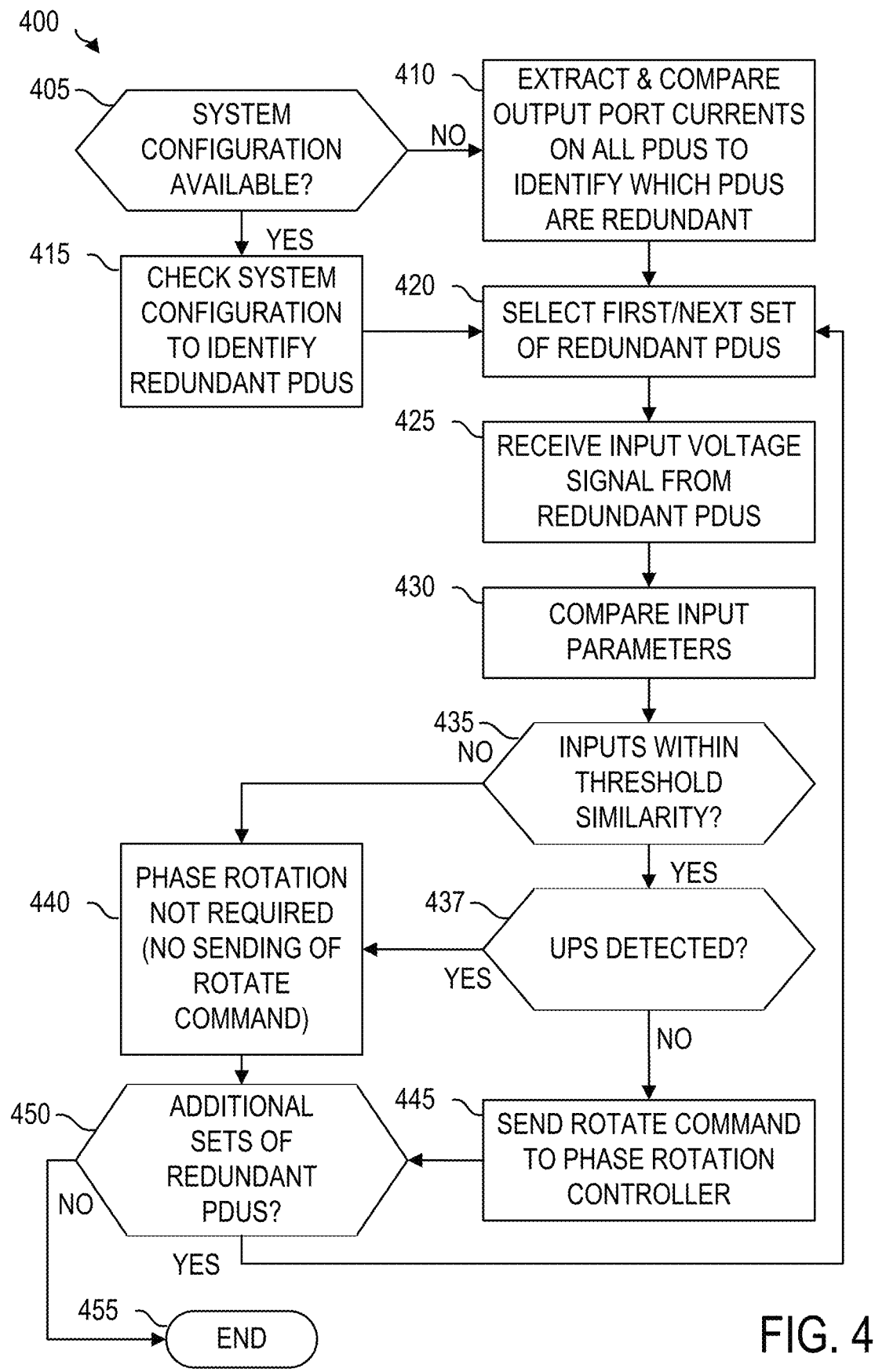
FIG. 4 is a flowchart illustrating a process for determining a need for phase rotation and performing the phase rotation when needed.

FIG. 4 is a flowchart that shows a process 400 for determining a need for phase rotation and performing the phase rotation when needed, and may be initiated, in some embodiments, during an initial power-on or if a plug event (plug or unplug) is detected. In some embodiments, the process 400 may be executed by the input monitoring and phase rotation analyzer 165. The input monitoring and phase rotation analyzer 165 may analyze the input signals at the input ports 190 of the two or more PDUs 175 and makes a determination as to whether phase rotation is required if it is detected that phases from separate PDUs are coming from the same power feed and supplying power to the same subcomponents 195.

The process 400 begins at decision 405 to determine if a system configuration is available (e.g., using the system configuration file 170 of the system controller 162). When the system configuration data 170 is not available (405:NO), the process moves to operation 410. In some embodiments, operation 410 extracts output port currents on all PDUs 175 to identify which PDUs 175 are redundant. In this case, both the output voltage and output current may be monitored by the input monitoring and phase rotation analyzer 165. In one or more embodiments, redundant PDUs 175 may be determined using a threshold similarity percentage per phase (e.g., ±5%) to account for differences (in, e.g., power factor) between subcomponents 195 and subcomponent PSUs. In an alternate embodiment, Process 400 could compare the input voltage and current to each PDU phase which may be compared to determine redundant PDUs 175. In this embodiment, there is no need to monitor the output port voltages and currents.

If the system configuration data is available (405:YES), then the process proceeds to operation 415 to check system configuration file 170 to identify redundant PDUs 175. After executing either operation 410 or operation 415, the process 400 executes operation 420 to begin/continue an iteration loop over the redundant sets of PDUs 175 by selecting the first/next set of redundant PDUs 175. The process continues at operation 425 and receives the input voltage signal from each of the PDUs 175 in the currently selected set of redundant PDUs 175. In one or more embodiments, the input voltage may be read over a specified duration of time (e.g., 30 seconds, 1 minute, etc.).

In one or more embodiments, the input voltage is not read until the subcomponents 195 or a combination of subcomponents 195 are fully up and running. This could either be after a pre-defined delay time (e.g., 1 hour, 2 hours, 24 hours, etc.), according to some embodiments, or in other embodiments, with feedback from a subcomponent 195 to the system controller 162 or the PPRS 160 over the network 155. In one or more embodiments, analog readings of the input signal from the input port 190 are sent from the PDU 175 to system controller 162 over the network 155. In one or more embodiments, discrete readings at a high sampling rate are sent from the PDU 175 to the system controller 162 over the network 155.

The process 400 continues at operation 430 in which the input parameters of the currently selected set of redundant PDUs 175 are compared. These input parameters may include, but are not limited to, amplitude, frequency, phase type, voltage type, etc. Next, a decision 435 is made to determine if the input parameters are within a pre-defined threshold similarity (e.g., ±2%). In one or more embodiments, all parameters extracted in operation 430 may have their own similarity threshold. In one or more embodiments, all parameters must be within their similarity threshold in order for this decision to be "YES". If the input parameters are within the threshold similarity (435:YES), the process continues to decision 437 to determine if a UPS 153 is detected on at least one input signal from the input port 190 in the currently selected set of redundant PDUs 175. In one or more embodiments, a UPS 153 may be detected by one or more of the following: 1) a drop in voltage and/or power efficiency 2) checking the system configuration file 170; 3) direct communication with a UPS 153 over the network 155. In an alternate embodiment, the threshold similarity may be set such that if a UPS 153 is inline between a power feed 151 and one of the PDUs 175, then this will not trigger the YES branch at 435. In that embodiment, the decision 437 is not needed.

If the input parameters are not within a threshold similarity (435:NO) or if a UPS is detected (437:YES), the process proceeds to operation 440 where a determination is made that a phase rotation is not required. In one or more embodiments, if operation 440 was reached after the operation 435 "No" branch, then this indicates that separate power feeds 151 are being utilized and the end user is not at risk if a single phase from one of those power feeds is lost.

In one or more embodiments, if operation 440 was reached after the 437 "Yes" branch, this indicates that a UPS is present on at least one input signal from the input port 190 to at least one PDU and that a backup power source exists so even if only a single power feed 151 is being used to supply an input signal 190 to all PDUs 175 in the currently selected set of redundant PDUs 175, there is backup power present in the event that a single phase from the power feed 151 is lost.

When a UPS is not detected (437: NO), the process continues to operation 445 and a rotate command is sent to phase rotation controller 180 of one of the PDUs 175 within the currently selected set of redundant PDUs 175. The rotate command could, according to some embodiments, simply be a bit that is set (e.g., set high to one) or a trigger signal to indicate that a signal should be sent to the transistors/switches to rotate the phase. In alternate embodiments, a phase rotation controller 180 may not be used and the trigger signal can be sent directly to the transistors/switches.

The phase rotation controller 180 activates the phase rotation switches 185 to ensure that the outputs of the PDU 175 provide power to a different group of subcomponents 195—this ensures that no subcomponents 195 will experience downtime in the event that a single phase from the one power feed 151 supplying the input signal to all PDUs 175 within the currently selected set of redundant PDUs 175 goes down.

After executing either operation 440 or operation 445, the process proceeds to decision 450 to determine if there are additional sets of redundant PDUs 175 to analyze. If there are additional sets of redundant PDUs 175 to analyze (450: YES), the process loops back to operation 420 to repeat the process on the next set of redundant PDUs. If there are no more sets of redundant PDUs 175 to analyze (445: NO), then the process ends 455.

Figure 5A:
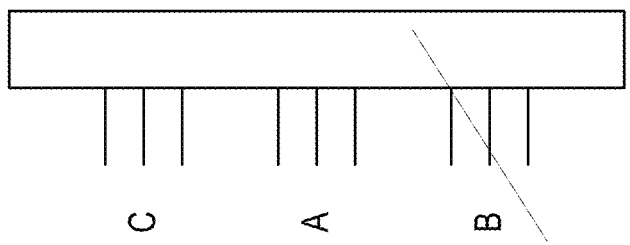
FIG. 5A is a block diagram that illustrates the results of a loss of phase in a wye configuration.
Figure 5A:
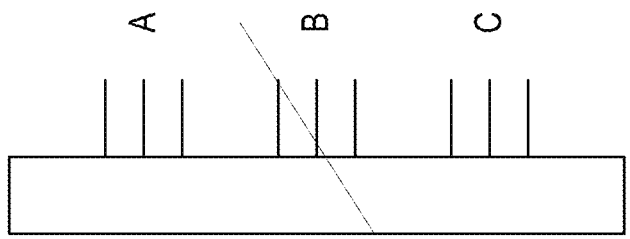

FIG. 5A is a block diagram that illustrates the beneficial effects of phase rotation after a loss of phase for the wye embodiment. As illustrated, a loss of the input phase B causes three outputs on each PDU to go down, but ⅔ of the equipment will maintain operation when phase rotation is implemented on one of the PDUs 175. The only components that will go down as a result of this phase B loss are the components connected to the middle set of both PDU outputs.

Figure 5B:
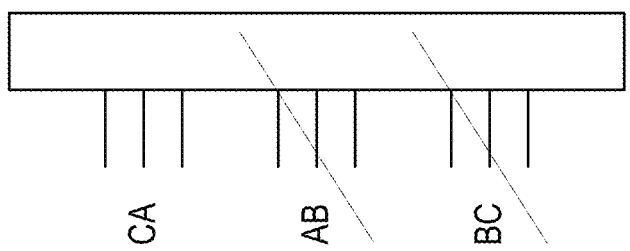
FIG. 5B is a block diagram that illustrates the results of a loss of phase in a delta configuration.
Figure 5B:
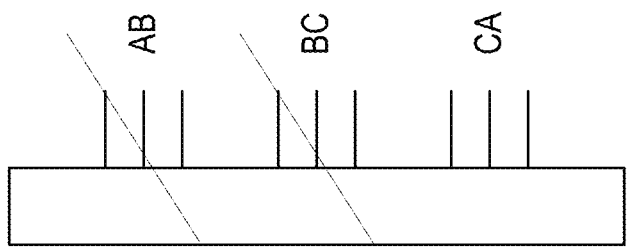

FIG. 5B is a block diagram that illustrates the beneficial effects of phase rotation after a loss of phase for the delta embodiment. As illustrated, a loss of the input phase B causes three outputs on each PDU to go down, but the equipment will maintain operation when phase rotation is implemented on one of the PDUs 175.

Figure 6A:
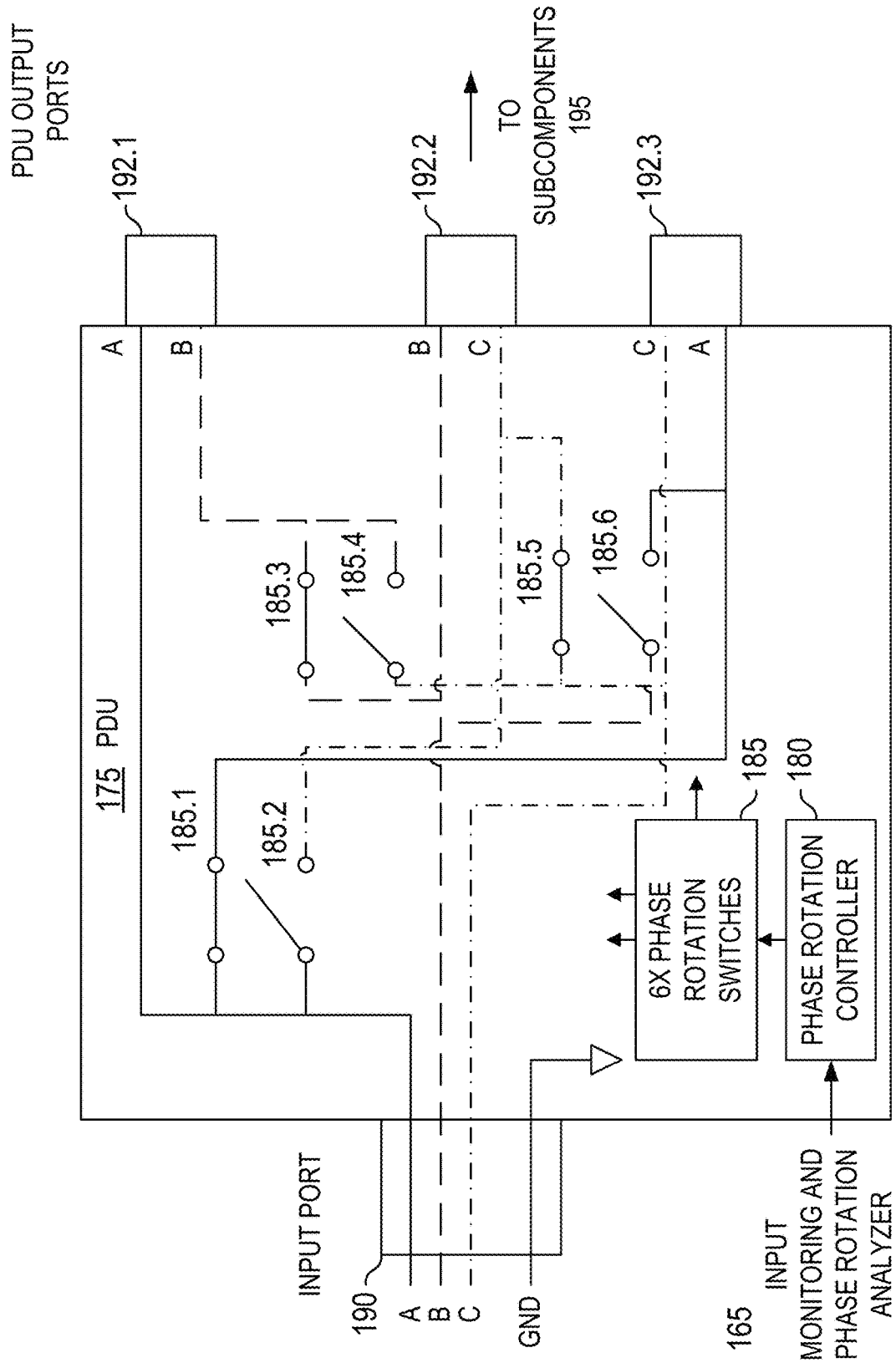
FIG. 6A is a block diagram that illustrates the switch configuration for a six-switch non-rotated delta configured system.

FIG. 6A is a block diagram that illustrates the switch configuration for a six-switch non-rotated delta configured system. The individual component descriptions for FIGS. 6A-7C are similar to those found with respect to FIGS. 2 and 3 and will not be repeated here. The following Table 5 provides the switch configuration for the six-switch non-rotated delta configured system, as shown in FIG. 6A.

TABLE 5

Switch Configuration (Non-Rotated) for Six-Switch Delta Configuration

| Switch | Status | Input (L) Φ | Output Port No | Output Port Conn. |
|---|---|---|---|---|
| 1 | closed | A | 1.1 | Input A |
|   |        |   | 3.2 | sw 1 |
| 2 | open   | A |     |         |
| 3 | closed | B | 2.1 | Input B |
|   |        |   | 1.2 | sw 3    |
| 4 | open   | C |     |         |
| 5 | closed | C | 3.1 | Input C |
|   |        |   | 2.2 | sw 5    |
| 6 | open   | B |     |         |

Figure 6B:
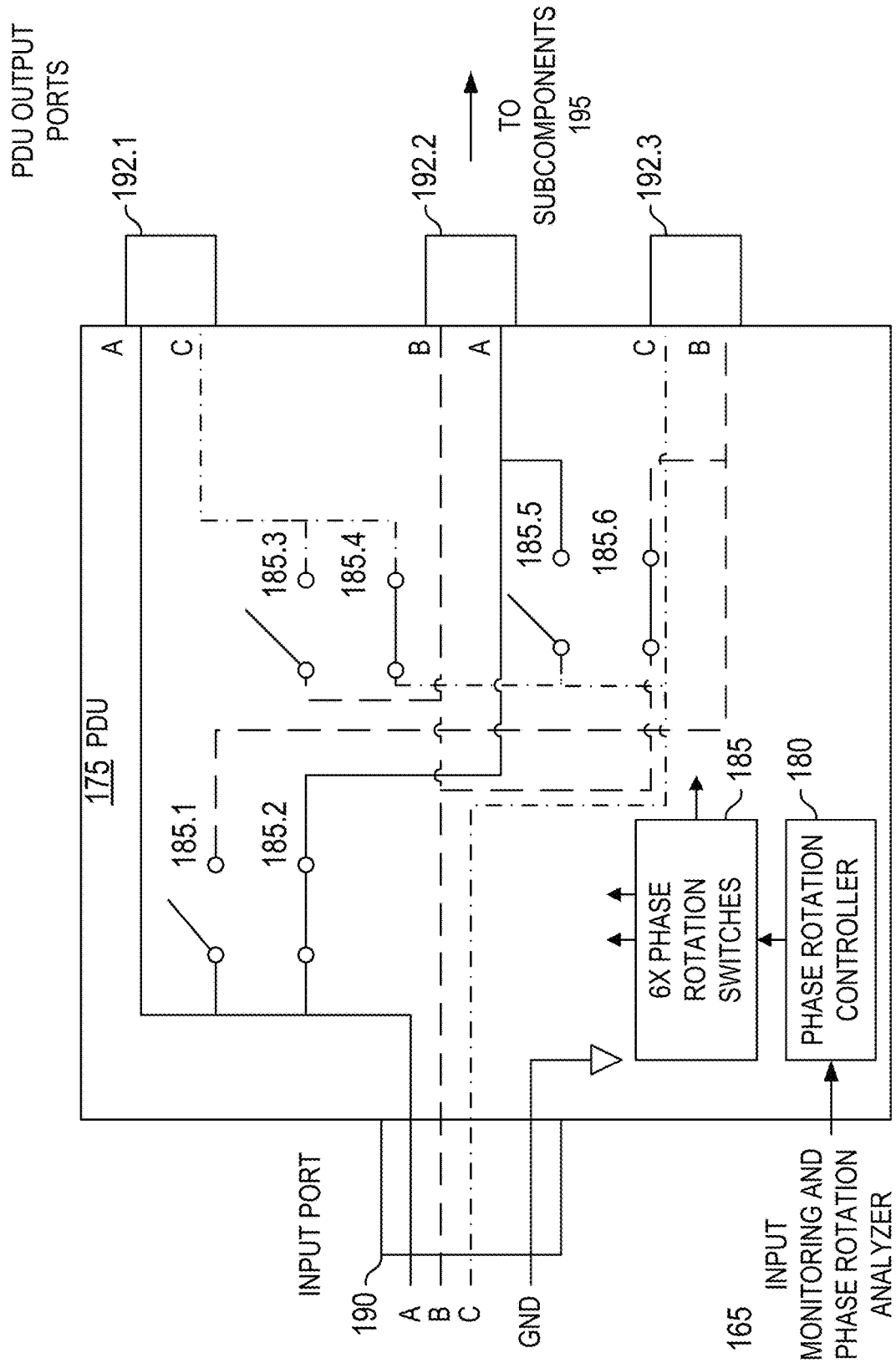
FIG. 6B is a block diagram that illustrates the switch configuration for a six-switch rotated delta configured system.

FIG. 6B is a block diagram that illustrates the switch configuration for a six-switch rotated delta configured system. The following Table 6 provides the switch configuration for the six-switch rotated delta configured system, as shown in FIG. 6B.

TABLE 6

Switch Configuration (Rotated) for Six-Switch Delta Configuration

| Switch | Status | Input (L) Φ | Output Port No | Output Port Conn. |
|---|---|---|---|---|
| 1 | open   | A |     |         |
| 2 | closed | A | 1.1 | Input A |
|   |        |   | 2.2 | sw 2    |
| 3 | open   | B | 2.1 | Input B |
| 4 | closed | C | 1.2 | sw 4    |
|   |        |   | 3.1 | Input C |
| 5 | open   | C |     |         |
| 6 | closed | B | 3.2 | sw 6    |

Figure 7A:
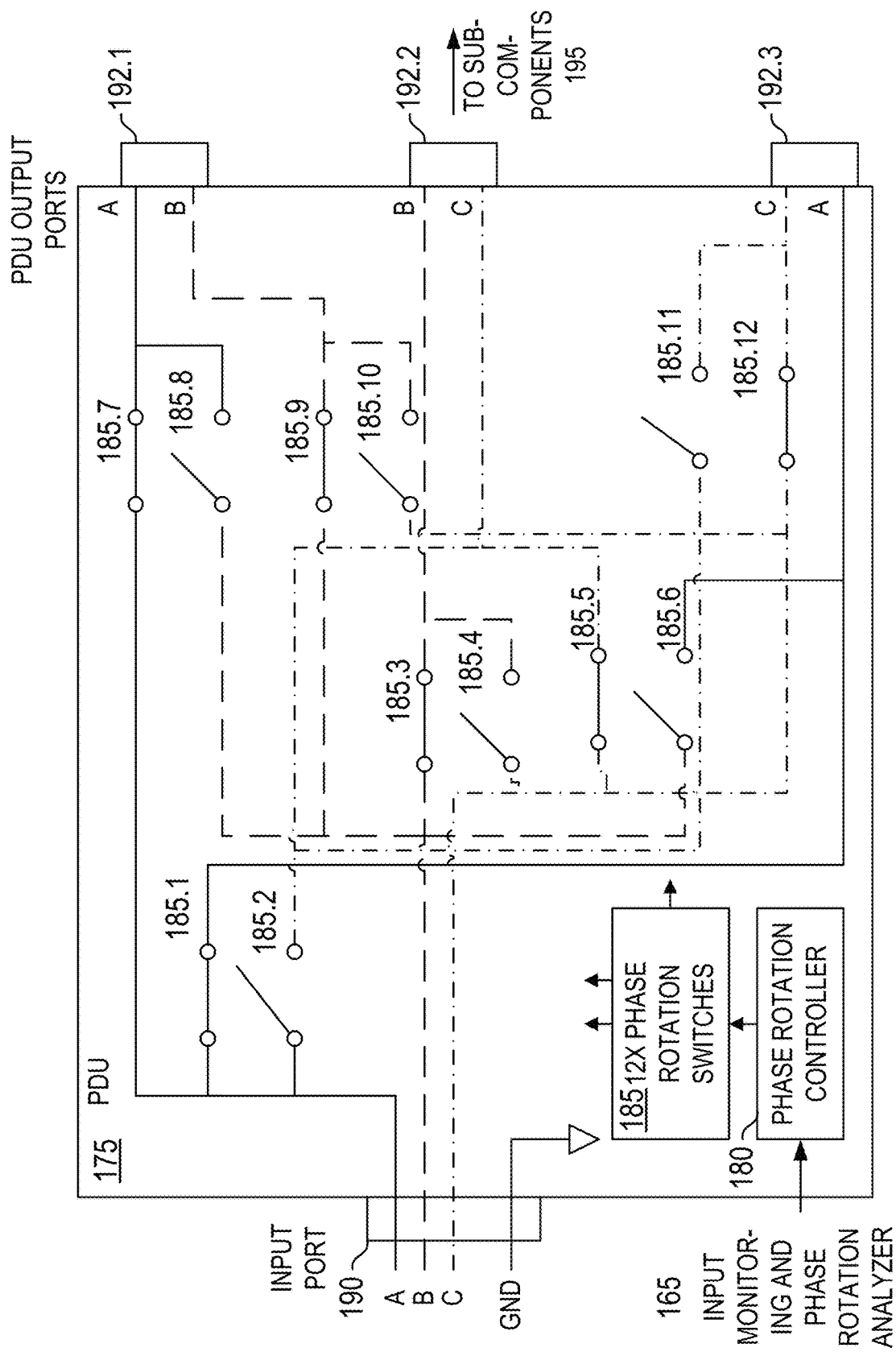
FIG. 7A is a block diagram that illustrates the switch configuration for a twelve-switch non-rotated delta configured system.

FIG. 7A is a block diagram that illustrates the switch configuration for a twelve-switch non-rotated delta configured system. The following Table 7 provides the switch configuration for the twelve-switch non-rotated delta configured system, as shown in FIG. 7A.

TABLE 7

Switch Configuration (Non-Rotated) for Twelve-Switch Delta Configuration

| Switch | Status | Input (L) Φ & Connected Source | Output Port No | Output Port Conn. |
|---|---|---|---|---|
| 1 | closed | A (Input A) | 3.2 | sw 1 |
| 2 | open   | A | | |
| 3 | closed | B (Input B) | 2.1 | sw 3 |
| 4 | open   | C | | |

TABLE 7-continued

Switch Configuration (Non-Rotated) for Twelve-Switch Delta Configuration

| Switch | Status | Input (L) Φ & Connected Source | Output Port No | Output Port Conn. |
|---|---|---|---|---|
| 5  | closed | C (Input C) | 2.2 | sw 5  |
| 6  | open   | B | | |
| 7  | closed | A (Input A) | 1.1 | sw 7  |
| 8  | open   | B | | |
| 9  | closed | B (Input B) | 1.2 | sw 9  |
| 10 | open   | C | | |
| 11 | open   | A | | |
| 12 | closed | C (Input C) | 3.1 | sw 12 |

Figure 7B:
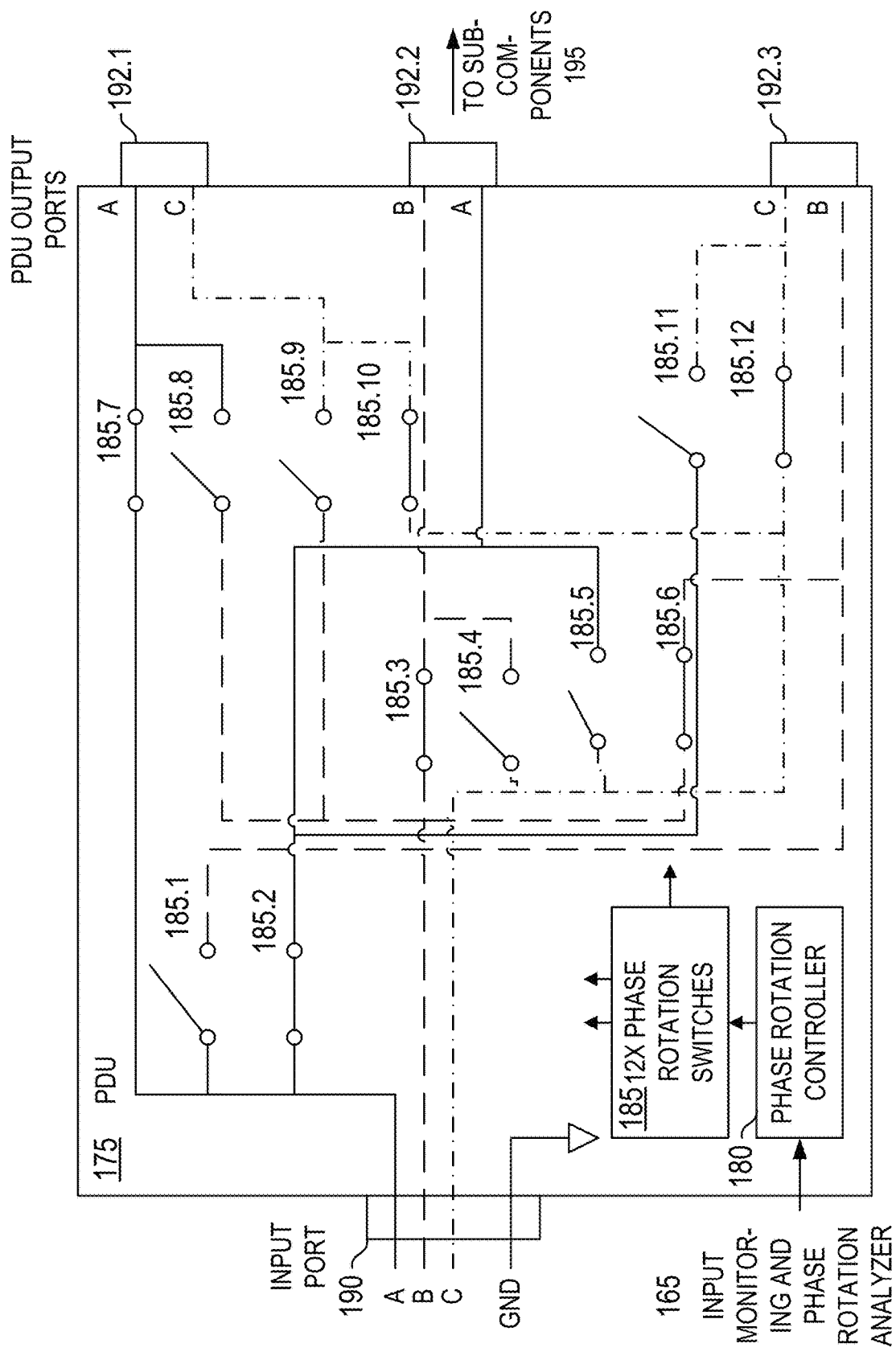
FIG. 7B is a block diagram that illustrates the switch configuration for a twelve-switch first-position-rotated delta configured system.

FIG. 7B is a block diagram that illustrates the switch configuration for a twelve-switch first-position-rotated delta configured system. The following Table 8 provides the switch configuration for a twelve-switch first-position-rotated delta configured system, as shown in FIG. 7B.

TABLE 8

Switch Configuration (First-Position-Rotated) for Twelve-Switch Delta Configuration

| Switch | Status | Input (L) Φ & Connected Source | Output Port No | Output Port Conn. |
|---|---|---|---|---|
| 1  | open   | A | | |
| 2  | closed | A (Input A) | 2.2 | sw 2  |
| 3  | closed | B (Input B) | 2.1 | sw 3  |
| 4  | open   | C | | |
| 5  | open   | C | | |
| 6  | closed | B (Input B) | 3.2 | sw 6  |
| 7  | closed | A (Input A) | 1.1 | sw 7  |
| 8  | open   | A | | |
| 9  | open   | C | | |
| 10 | closed | C (Input C) | 1.2 | sw 10 |
| 11 | open   | C | | |
| 12 | closed | C (Input C) | 3.1 | sw 12 |

Figure 7C:
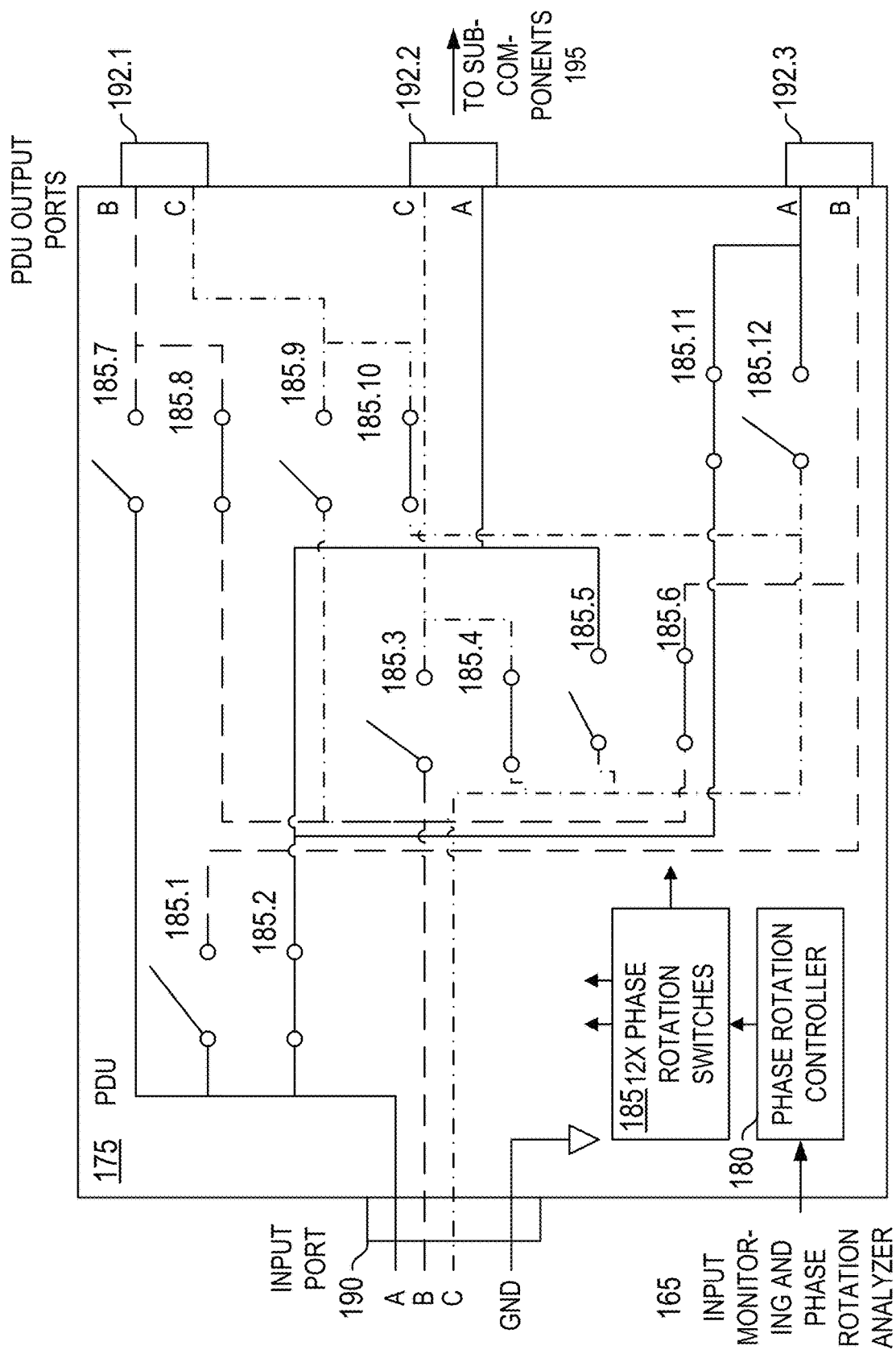
FIG. 7C is a block diagram that illustrates the switch configuration for a twelve-switch second-position-rotated delta configured system.

FIG. 7C is a block diagram that illustrates the switch configuration for a twelve-switch second-position-rotated delta configured system. The following Table 9 provides the switch configuration for the twelve-switch second-position-rotated delta configured system, as shown in FIG. 7C.

TABLE 9

Switch Configuration (Second-Position-Rotated) for Twelve-Switch Delta Configuration

| Switch | Status | Input (L) Φ & Connected Source | Output Port No | Output Port Conn. |
|---|---|---|---|---|
| 1  | open   | A | | |
| 2  | closed | A (Input A) | 2.2 | sw 2  |
| 3  | open   | B | | |
| 4  | closed | C (Input C) | 2.1 | sw 4  |
| 5  | open   | C | | |
| 6  | closed | B (Input B) | 3.2 | sw 6  |
| 7  | open   | A | | |
| 8  | closed | A (Input B) | 1.1 | sw 8  |
| 9  | open   | C | | |
| 10 | closed | C (Input C) | 1.2 | sw 10 |
| 11 | closed | C | 3.1 | sw 11 |
| 12 | open   | C | | |

Technical Application

The one or more embodiments disclosed herein accordingly provide an improvement to technology, namely to improving power distribution within computer components of a computer system.

EXAMPLES

The following examples illustrate various configurations for embodiments disclosed herein.

1. A computer-implemented method for controlling a dynamic phase rotation unit of a power distribution unit (PDU), the method comprising:
   using a processor of a system controller:
      identifying a PDU group of two or more redundant PDUs;
      receiving input parameters from an input port of each of the PDUs in the PDU group;
      comparing the input parameters from of the PDU group; and
      conditioned upon a determination of the following both being true:
         the input parameters are within a predefined threshold of similarity; and
         no uninterruptable power supply (UPS) is present;
      then, responsive to the determination:
         sending, via a network, a phase rotation command to a phase rotation controller to change the phase rotation switches on at least one of the PDUs in the PDU group;
      otherwise, responsive to the determination:
         not sending the phase rotation command.

Example 1 provides a technical advantage by providing an active power phase to a subcomponent when that phase goes out, conditioned on there being no UPS present and when the input parameters are within a predefined threshold of similarity.

2. The method of example 1, where the identifying comprises:
   analyzing a system configuration file containing information about the system configuration.

Example 2 provides a technical advantage by using predefined system configuration information to identify system PDUs.

3. The method of examples 1 and 2, where the identifying comprises:
   extracting and comparing a current draw on output ports of each PDU within the PDU group.

Example 3 provide a technical advantage by identifying PDUs based on measured characteristics of the system.

4. The method of example 3, where the comparing of the current draw on the PDU output ports determines similarity of current draw to other PDUs among the PDU group when the current draw on each output port is within a threshold value of the current draw on a same input phase of another PDU within the PDU group.

Example 4 further refines Example 3 by calling out specific measured characteristics.

5. The method of examples 1 through 4, where the comparison of input parameters includes comparing one or more of voltage amplitude, frequency, phase type, and voltage type.

Example 5 further refines Example 4 by calling out specific measured characteristics.

6. The method of examples 1 through 5, where the comparison of input parameters includes determining that the input signal of all PDUs in the PDU group is within a predefined threshold value of each other.

Example 6 further refines how the input parameters are compared.

7. The method of examples 1 through 6, further comprising detecting a presence or absence of a UPS on at least one input signal of the PDU group.

Example 7 further dictates a determination as to whether an uninterruptable power supply is present or not (and hence, the need for changing phase assignments).

8. The method of example 7, where a UPS is detected by an action selected from the group consisting of determining a drop in voltage according to a predefined voltage drop threshold, determining a drop in power efficiency according to a predefined power efficiency threshold, checking a system configuration file that indicates a presence of the UPS, and receiving a communication from the UPS indicating its presence.

Example 8 is a further refinement on example 7 that specifies how the UPS is detected.

9. The method of examples 1 through 8, where the phase rotation command is directed to a wye configuration for the phase rotation switches.

Example 9 provides the above-noted technical improvements for a wye connected three-phase power system.

10. The method of example 9, where the phase rotation switches consist of six phase rotation switches.

Example 10 provides for a specific number of switches that may be used on the PDU.

11. The method of examples 1 through 10, where the phase rotation command is directed to a delta configuration for the phase rotation switches.

Example 11 provides the above-noted technical improvements for a delta connected three-phase power system.

12. The method of example 11, where the phase rotation switches consist of six phase rotation switches.

Example 12 provides for a specific number of switches that may be used on the PDU. The six-switch system may be less costly in terms of resources, but not as flexible as a twelve phase rotation switch system.

13. The method of example 11, where the phase rotation switches consist of twelve phase rotation switches.

Example 13 provides for a specific number of switches that may be used on the PDU. The twelve-switch system may be more costly in terms of resources, but will also be more flexible than the six-phase rotation switch system.

Similar technical advantages may be found with regard to corresponding apparatus and system claims below.

14. A system controller apparatus for controlling a dynamic phase rotation unit of a power distribution unit (PDU), the system controller comprising:
   a memory; and
   a processor that executes instructions stored in the memory and is configured to:
      identify a PDU group of two or more redundant PDUs;
      receive input parameters from an input port of each of the PDUs in the PDU group;
      compare the input parameters from of the PDU group; and
      conditioned upon a determination of the following both being true:
         the input parameters are within a predefined threshold of similarity; and
         no uninterruptable power supply (UPS) is present;
      then, responsive to the determination:

send, via a network, a phase rotation command to a phase rotation controller to change the phase rotation switches on at least one of the PDUs in the PDU group;

otherwise, responsive to the determination:

not send the phase rotation command.

15. The apparatus of example 14, where the processor is further configured to:

extract and compare a current draw on output ports of each PDU within the PDU group; and for the comparison of the current draw on the PDU output ports, determine a similarity of current draw to other PDUs among the PDU group when the current draw on each output port is within a threshold value of the current draw on a same input phase of another PDU within the PDU group.

16. The apparatus of examples 14 and 15, where the processor is further configured to:

detect a presence or absence of a UPS on at least one input signal of the PDU group, where a UPS is detected by an action selected from the group consisting of determining a drop in voltage according to a predefined voltage drop threshold, determining a drop in power efficiency according to a predefined power efficiency threshold, checking a system configuration file that indicates a presence of the UPS, and receiving a communication from the UPS indicating its presence.

17. A power distribution unit (PDU) system, comprising:

a system controller apparatus for controlling a dynamic phase rotation unit of a power distribution unit (PDU), the system controller comprising:

a memory; and a processor that executes instructions stored in the memory and is configured to:

identify a PDU group of two or more redundant PDUs;

receive input parameters from an input port of each of the PDUs in the PDU group;

compare the input parameters from of the PDU group; and conditioned upon a determination of the following both being true:

the input parameters are within a predefined threshold of similarity; and no uninterruptable power supply (UPS) is present;

then, responsive to the determination:

send, via a network, a phase rotation command to a phase rotation controller to change the phase rotation switches on at least one of the PDUs in the PDU group;

otherwise, responsive to the determination:

not send the phase rotation command.

the PDU, where the PDU comprises a phase rotation controller located on the PDU, and the phase rotation controller comprises:

a memory and a processor that executes instructions stored in the memory and is configured to:

receive the phase rotation command; and responsive to receipt the phase rotation command, rotate the phases of the PDU.

Example 17 provides the technical advantages discussed with respect to Example 1, and further provides for incorporating the actual phase rotation controller that is used to control the switches.

18. The system of example 17, where the rotation of the phases of the PDU comprises changing a configuration of six phase rotation switches for a wye configuration.

19. The system of example 17, where the rotation of the phases of the PDU comprises changing a configuration of six phase rotation switches for a delta configuration.

20. The system of example 17, where the rotation of the phases of the PDU comprises changing a configuration of twelve phase rotation switches for a delta configuration.

What is claimed is:

1. A computer-implemented method for controlling a dynamic phase rotation unit of a power distribution unit (PDU), the method comprising:

using a processor of a system controller:

identifying a PDU group of two or more redundant PDUs;

receiving input parameters from an input port of the PDUs in the PDU group;

comparing the input parameters from the PDU group; and conditioned upon a determination of the following both being true:

the input parameters are within ±2%; and no uninterruptable power supply (UPS) is present;

then, responsive to the determination:

sending, via a network, a phase rotation command to a phase rotation controller to change phase rotation switches on at least one of the PDUs in the PDU group;

otherwise, responsive to the determination:

not sending the phase rotation command.

2. The computer-implemented method of claim 1, wherein the identifying comprises:

analyzing a system configuration file containing information about a system configuration.

3. The computer-implemented method of claim 1, wherein the identifying comprises:

extracting and comparing a current draw on output ports of the PDUs within the PDU group.

4. The computer-implemented method of claim 3, wherein the comparing of the current draw on the output ports determines similarity of the current draw to other PDUs among the PDU group when the current draw on the output ports is within a threshold value of the current draw on a same input phase of another of the PDUs within the PDU group.

5. The computer-implemented method of claim 1, wherein the comparing of the input parameters includes comparing one or more of voltage amplitude, frequency, phase type, and voltage type.

6. The computer-implemented method of claim 1, wherein the comparing the input parameters includes determining that input signals of all of the PDUs in the PDU group are within a predefined threshold value of each other.

7. The computer-implemented method of claim 1, further comprising: detecting a presence or an absence of the UPS on at least one input signal of the PDU group.

8. The computer-implemented method of claim 7, wherein the UPS is detected by an action selected from a group consisting of determining a drop in voltage according to a predefined voltage drop threshold, determining a drop in power efficiency according to a predefined power efficiency threshold, checking a system configuration file that indicates the presence of the UPS, and receiving a communication from the UPS indicating the presence.

9. The computer-implemented method of claim 1, wherein the phase rotation command is directed to a wye configuration for the phase rotation switches.

10. The computer-implemented method of claim 9, wherein the phase rotation switches consist of six phase rotation switches.

11. The computer-implemented method of claim 1, wherein the phase rotation command is directed to a delta configuration for the phase rotation switches.

12. The computer-implemented method of claim 11, wherein the phase rotation switches consist of six phase rotation switches.

13. The computer-implemented method of claim 11, wherein the phase rotation switches consist of twelve phase rotation switches.

14. A system controller apparatus for controlling a dynamic phase rotation unit of a power distribution unit (PDU), the system controller comprising:
a memory; and
a processor that executes instructions stored in the memory and is configured to:
identify a PDU group of two or more redundant PDUs;
receive input parameters from an input port of the PDUs in the PDU group;
compare the input parameters from the PDU group; and
conditioned upon a determination of the following both being true:
the input parameters are within ±2%; and
no uninterruptable power supply (UPS) is present;
then, responsive to the determination:
send, via a network, a phase rotation command to a phase rotation controller to change phase rotation switches on at least one of the PDUs in the PDU group;
otherwise, responsive to the determination:
not send the phase rotation command.

15. The system controller apparatus of claim 14, wherein the processor is further configured to:
extract and compare a current draw on output ports of each the PDUs within the PDU group; and
for the compare of the current draw on the output ports, determine a similarity of the current draw to other of the PDUs among the PDU group when the current draw on the output ports is within a threshold value of the current draw on a same input phase of another of the PDUs within the PDU group.

16. The system controller apparatus of claim 14, wherein the processor is further configured to:
detect a presence or an absence of the UPS on at least one input signal of the PDU group, wherein the UPS is detected by an action selected from a group consisting of determining a drop in voltage according to a predefined voltage drop threshold, determining a drop in power efficiency according to a predefined power efficiency threshold, checking a system configuration file that indicates a presence of the UPS, and receiving a communication from the UPS indicating the presence.

17. A power distribution unit (PDU) system, comprising:
a system controller apparatus for controlling a dynamic phase rotation unit of a power distribution unit (PDU), the system controller apparatus comprising:
a memory; and
a processor that executes instructions stored in the memory and is configured to:
identify a PDU group of two or more redundant PDUs;
receive input parameters from an input port of the PDUs in the PDU group;
compare the input parameters from the PDU group; and
conditioned upon a determination of the following both being true:
the input parameters are within ±2%; and
no uninterruptable power supply (UPS) is present;
then, responsive to the determination:
send, via a network, a phase rotation command to a phase rotation controller to change phase rotation switches on at least one of the PDUs in the PDU group;
otherwise, responsive to the determination:
not send the phase rotation command;
the PDU, wherein the PDU comprises a phase rotation controller located on the PDU, and the phase rotation controller comprises:
a memory and a processor that executes instructions stored in the memory and is configured to:
receive the phase rotation command; and
responsive to receipt of the phase rotation command, rotation of phases of the PDU.

18. The PDU system of claim 17, wherein the rotation of the phases of the PDU comprises changing a configuration of six phase rotation switches for a wye configuration.

19. The PDU system of claim 17, wherein the rotation of the phases of the PDU comprises changing a configuration of six phase rotation switches for a delta configuration.

20. The PDU system of claim 17, wherein the rotation of the phases of the PDU comprises changing a configuration of twelve phase rotation switches for a delta configuration.

* * * * *